(12) United States Patent
Zhou et al.

(10) Patent No.: US 8,891,856 B2
(45) Date of Patent: Nov. 18, 2014

(54) METHOD OF AUTOMATICALLY DETECTING IMAGE FORMAT AND DEVICE THEREOF

(71) Applicant: NOVATEK Microelectronics Corp., Hsin-Chu (TW)

(72) Inventors: Lei Zhou, Shanghai (CN); Guangzhi Liu, Shanghai (CN); Heng Yu, Shanghai (CN); Chun Wang, Shanghai (CN)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 184 days.

(21) Appl. No.: 13/688,235

(22) Filed: Nov. 29, 2012

(65) Prior Publication Data
US 2014/0050402 A1     Feb. 20, 2014

(30) Foreign Application Priority Data

Aug. 15, 2012  (CN) .......................... 2012 1 0290634

(51) Int. Cl.
*G06K 9/00* (2006.01)
*G06T 7/00* (2006.01)
*H04N 13/00* (2006.01)

(52) U.S. Cl.
CPC .............. *G06T 7/0081* (2013.01); *H04N 13/00* (2013.01)
USPC .......................................... 382/154; 345/419

(58) Field of Classification Search
None
See application file for complete search history.

(56) References Cited

U.S. PATENT DOCUMENTS

| 2010/0321390 A1* | 12/2010 | Kim et al. ...................... 345/427 |
| 2011/0164110 A1* | 7/2011 | Fortin et al. ..................... 348/43 |
| 2011/0293170 A1* | 12/2011 | Hatasawa et al. ............. 382/154 |
| 2012/0328182 A1* | 12/2012 | Tsukagoshi et al. .......... 382/154 |
| 2013/0114885 A1* | 5/2013 | Ha ................................ 382/154 |
| 2013/0266207 A1* | 10/2013 | Zhang et al. .................. 382/154 |
| 2014/0050402 A1* | 2/2014 | Zhou et al. .................... 382/173 |

* cited by examiner

*Primary Examiner* — Sean Motsinger
(74) *Attorney, Agent, or Firm* — Winston Hsu; Scott Margo

(57) ABSTRACT

A method of detecting image format includes dividing a single-frame image into a plurality of macro-blocks; calculating a correlation coefficient of a left-half image of the single-frame image and a right-half image of the single-frame image as a first global similarity; calculating a correlation coefficient of a top-half image of the single-frame image and a bottom-half image of the single-frame image as a second global similarity; calculating a portion difference of each macro-block; comparing the portion differences of the left-half image and the right-half image, for acquiring a first local similarity; comparing the portion differences of the top-half image and the bottom-half image, for acquiring a second local similarity; and detecting an image format of the single-frame image according to the first global similarity, the second global similarity, the first local similarity, the second local similarity, a first threshold and a second threshold.

28 Claims, 5 Drawing Sheets

METHOD OF AUTOMATICALLY DETECTING IMAGE FORMAT AND DEVICE THEREOF

BACKGROUND OF THE INVENTION

1. Field of the Invention

The present invention relates to a detecting method and device thereof capable of automatically detecting image formats, and more particularly, to a detecting method and device thereof capable of automatically detecting image formats according to image contents.

2. Description of the Prior Art

Three-dimensional (3D) display technology provides more a vivid visual experience than two-dimensional (2D) display technology. 3D image processing includes at least two image systems comprising images or videos taken from two slightly different angles and positions. The effect of the slight difference between angles and positions can also be generated by certain algorithms, wherein the different angles and positions are analogous to a depth of field generated between the eyes of a human. These two kinds of image are overlapped into a combined 3D image, and then displayed on a television or movie screen to audiences. The left eye of the audience can only see one kind of image and the right eye of the audience can only see another kind of image, such that the audience feels an illusion of depth of field which is analogous to real sight.

High Definition Multimedia Interface (HDMI) is the highest level video transition standard jointly defined by Hitachi, Panasonic, Royal Philips, Silicon Image, Sony, Thomson and Toshiba. HDMI is an interface of all-digital images and sounds with broad bandwidth which can use a single cable to transmit un-archived audio signals and video signals. In order to improve the 3D images transmitting effect, HDMI Licensing, LLC defines multiple 3D image formats, such as frame packing, side-by-side and top-bottom, in HDMI 1.4a specifications issued on Mar. 4, 2010. In modern image systems, the side-by-side format and the top-bottom format have become the mainstream 3D image format.

The image system not only can play 3D images, but also can play conventional 2D images. When playing images of a different type or 3D images with a different 3D image format, the image system needs to adopt a suitable display method to avoid degrading the image quality. For example, if 3D images with a side-by-side format are played via a standard 2D method, the image frame displayed by the image system would be divided into left-half and right half, therefore requiring a user to manually adjust the image system.

SUMMARY OF THE INVENTION

Therefore, the present invention provides a detecting method and related device capable of automatically detecting an image format for automatically determining an image format of a single frame image, so as to provide a more convenient user experience.

The present invention discloses a method of automatically detecting image formats. The method includes dividing a single frame image into a plurality of first macro-blocks; calculating a correlation coefficient between a plurality of image features of a plurality of first left macro-blocks and a plurality of image features of a plurality of first right macro-blocks as a first global similarity, wherein a first left macro-block is the macro-block of the plurality of first macro-blocks belonging to a left-half image of the single frame image and a first right macro-block is the macro-block of the plurality of first macro-blocks belonging to a right-half image of the single frame image; calculating a correlation coefficient between a plurality of image features of a plurality of first top macro-blocks and a plurality of image features of a plurality of first bottom macro-blocks as a second global similarity, wherein a first top macro-block is the macro-block of the plurality of first macro-blocks belonging to an upper-half image of the single frame image and a first bottom macro-block is the macro-block of the plurality of first macro-block belonging to a lower-half image of the single frame image; calculating a portion difference of each first macro-block according to the image feature of each first macro-block; comparing the portion difference of each first left macro-block and the portion difference of the corresponding first right macro-block for acquiring a first local similarity; comparing the portion difference of each first top macro-block and the portion difference of the corresponding first bottom macro-block for acquiring a second local similarity; and detecting a format of the single frame image according to the first global similarity, the second global similarity, the first local similarity, the second local similarity, a first threshold and a second threshold.

The present invention further discloses an image format detecting device. The image format detecting device includes a processing unit; and a storage unit, for storing a program code for instructing the processing unit to perform the following steps: dividing a single frame image into a plurality of first macro-blocks; calculating a correlation coefficient between a plurality of image features of a plurality of first left macro-blocks and a plurality of image features of a plurality of first right macro-blocks as a first global similarity, wherein a first left macro-block is the macro-block of the plurality of first macro-blocks belonging to a left-half image of the single frame image and a first right macro-block is the macro-block of the plurality of first macro-blocks belonging to a right-half image of the single frame image; calculating a correlation coefficient between a plurality of image features of a plurality of first top macro-blocks and a plurality of image features of a plurality of first bottom macro-blocks as a second global similarity, wherein a first top macro-block is the macro-block of the plurality of first macro-blocks belonging to an upper-half image of the single frame image and a first bottom macro-block is the macro-block of the plurality of first macro-block belonging to a lower-half image of the single frame image; calculating a portion difference of each first macro-block according to the image feature of each first macro-block; comparing the portion difference of each first left macro-block and the portion difference of the corresponding first right macro-block for acquiring a first local similarity; comparing the portion difference of each first top macro-block and the portion difference of the corresponding first bottom macro-block for acquiring a second local similarity; and detecting a format of the single frame image according to the first global similarity, the second global similarity, the first local similarity, the second local similarity, a first threshold and a second threshold.

These and other objectives of the present invention will no doubt become obvious to those of ordinary skill in the art after reading the following detailed description of the preferred embodiment that is illustrated in the various figures and drawings.

DETAILED DESCRIPTION

According to the above operational principle of 3D images, a frame of the 3D image includes two images with different depths of field. The 3D images of the side-by-side format arrange the two images with different depths of field at a left-half part and right-half part of the frame, separately. The 3D images of the top-bottom format arrange the two images with different depths of field at an upper-half part and lower-half part of the frame. In other words, the left-half part and the right-half part of the 3D image with the side-by-side format are highly similar. Similarly, the upper-half part and the lower-half part of the 3D image with the top-bottom format are highly similar. Thus, the present invention can automatically detect the image format of a single frame image according to the similarity in the single frame image.

Figure 1:
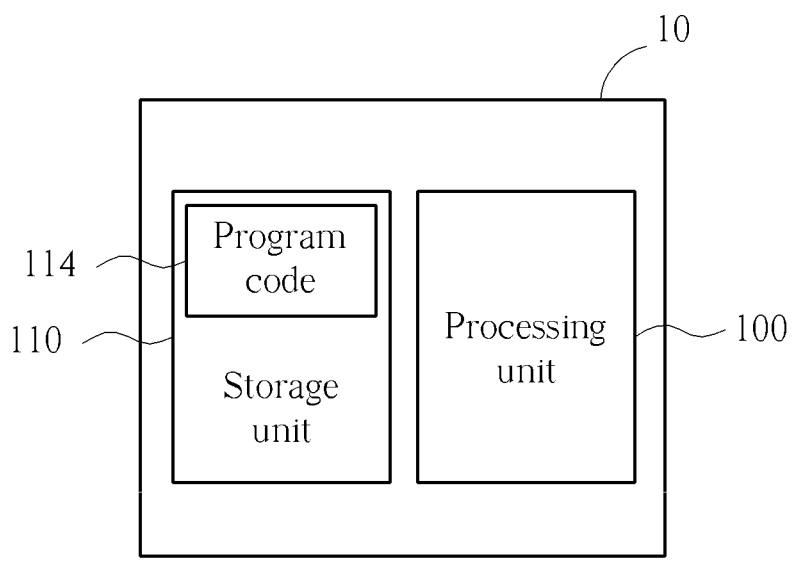
FIG. 1 is a schematic diagram of an image format detecting device according to an embodiment of the present invention.

Please refer to FIG. 1, which is a schematic diagram of an image format detecting device 10 according to an embodiment of the present invention. The image format detecting device 10 may be utilized in a multi-media image system, but is not limited herein. The image format detecting device 10 includes a processing unit 100 such as a microprocessor or an Application Specific Integrated Circuit (ASIC) and a storage unit 110. The storage unit 110 may be any data storage device that can store a program code 114, accessed by the processing unit 100. Examples of the storage unit 110 include, but are not limited to, a subscriber identity module (SIM), read-only memory (ROM), flash memory, random-access memory (RAM), CD-ROM/DVD-ROM, magnetic tape, hard disk, and optical data storage device.

Figure 2A:
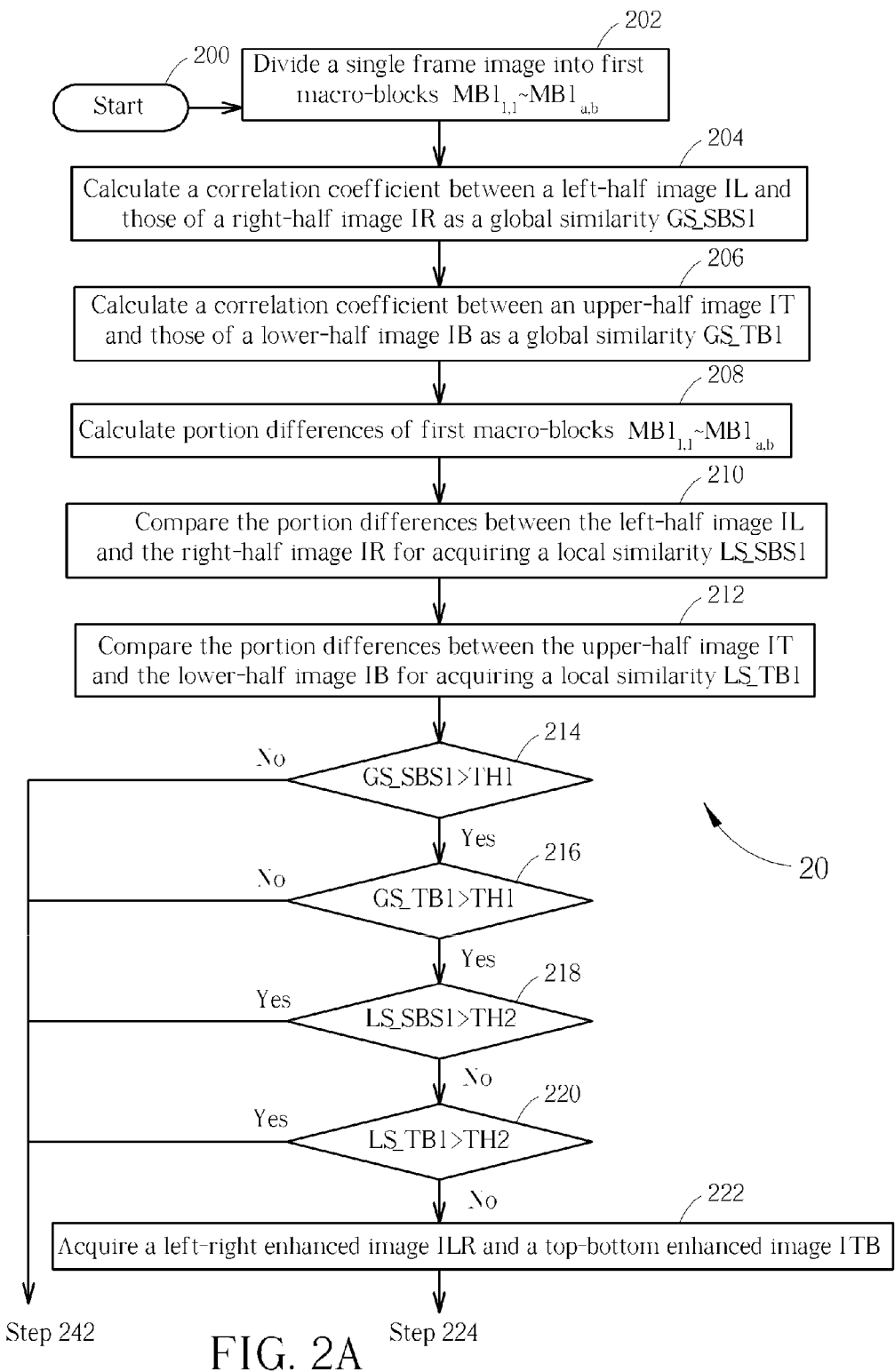
FIG. 2A and FIG. 2B are schematic diagrams of a detecting method according to an embodiment of the present invention.
Figure 2B:
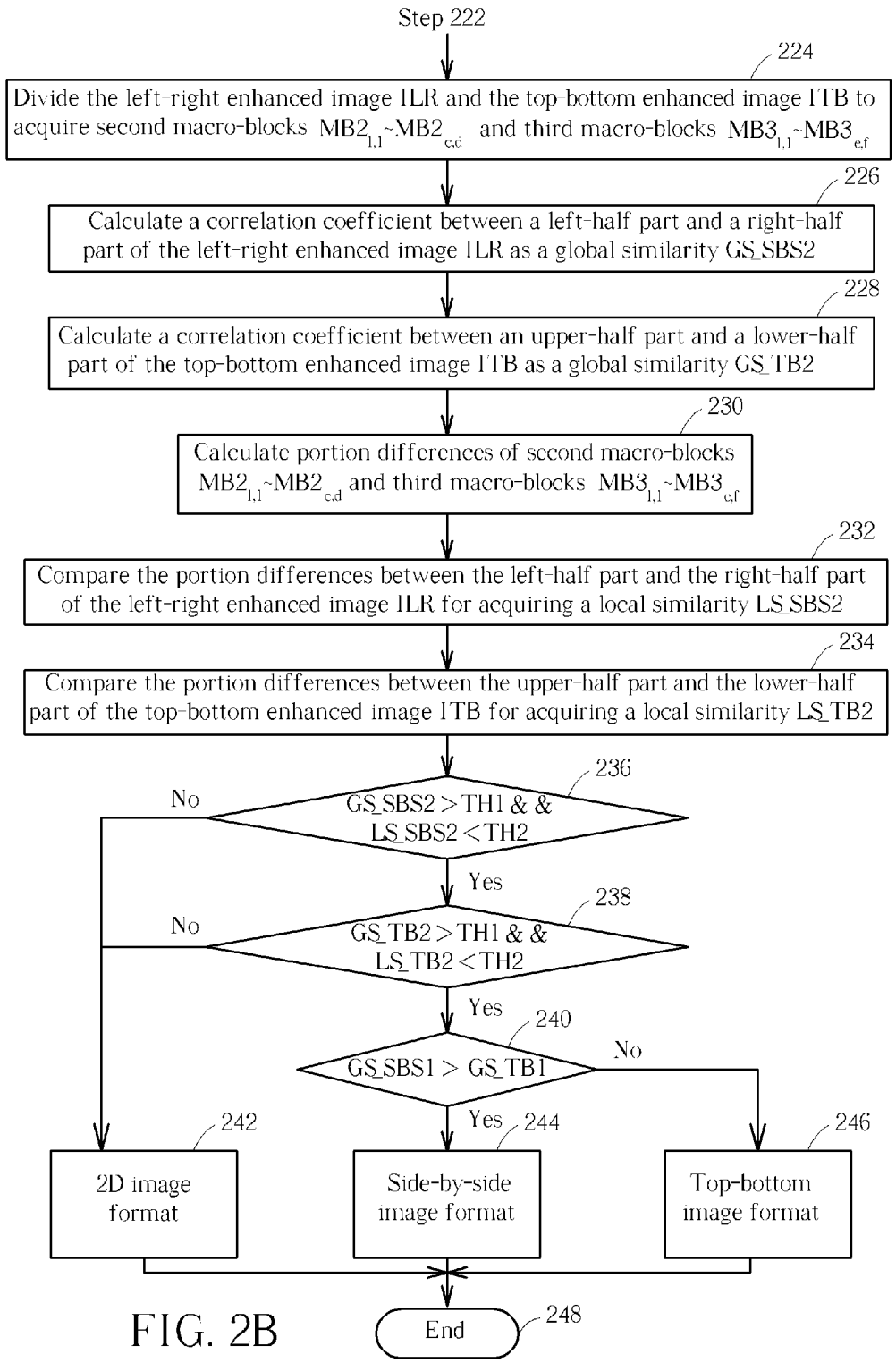

Please refer to FIG. 2A and FIG. 2B, which are schematic diagrams of a detecting method 20 according to an embodiment of the present invention. The detecting method 20 is utilized in an image detecting device of a multi-media image system and can be compiled in the program code 114 shown in FIG. 1. The detecting method 20 includes the following steps:

Step 200: Start.

Step 202: Divide a single frame image into first macro-blocks $MB1_{1,1}$~$MB1_{a,b}$.

Step 204: Calculate a correlation coefficient between a plurality of image features of a plurality of first left macro-blocks and a plurality of image features of a plurality of first right macro-blocks as a global similarity GS_SBS1, wherein a first left macro-block is the macro-block of the first macro-blocks $MB1_{1,1}$~$MB1_{a,b}$ belonging to a left-half image IL of the single frame image and a first right macro-block is the macro-block of the first macro-blocks $MB1_{1,1}$~$MB1_{a,b}$ belonging to a right-half image IR of the single frame image.

Step 206: Calculate a correlation coefficient between a plurality of image features of a plurality of first top macro-blocks and a plurality of image features of a plurality of first bottom macro-blocks as a global similarity GS_TB1, wherein a first top macro-block is the macro-block of the first macro-blocks $MB1_{1,1}$~$MB1_{a,b}$ belonging to an upper-half image IT of the single frame image and a first bottom macro-block is the macro-block of the first macro-blocks $MB1_{1,1}$~$MB1_{a,b}$ belonging to a lower-half image IB of the single frame image.

Step 208: Calculate portion differences of first macro-blocks $MB1_{1,1}$~$MB1_{a,b}$ according to the image feature of first macro-blocks $MB1_{1,1}$~$MB1_{a,b}$.

Step 210: Compare the portion difference of each first left macro-block and the portion difference of the corresponding first right macro-block for acquiring a local similarity LS_SBS1.

Step 212: Compare the portion difference of each first top macro-block and the portion difference of the corresponding first bottom macro-block for acquiring a local similarity LS_TB1.

Step 214: Determine whether the global similarity GS_SBS1 is greater than a threshold TH1. If the global similarity GS_SBS1 is greater than the threshold TH1, perform step 216; otherwise, perform step 242.

Step 216: Determine whether the global similarity GS_TB1 is greater than the threshold TH1. If the global similarity GS_TB1 is greater than the threshold TH1, perform step 218; otherwise, perform step 242.

Step 218: Determine whether the local similarity LS_SBS1 is smaller than a threshold TH2. If the local similarity LS_SBS1 is smaller than the threshold TH2, perform step 220; otherwise, perform step 242.

Step 220: Determine whether the local similarity LS_TB1 is smaller than the threshold TH2. If the local similarity LS_TB1 is smaller than the threshold TH2, perform step 222; otherwise, perform step 242.

Step 222: Subtract the image features of the upper-half image IT and the image features of the lower-half image IB for acquiring a left-right enhanced image ILR and subtract the image features of the left-half image IL and the image features of the right-half image IR for acquiring a top-bottom enhanced image ITB.

Step 224: Divide the left-right enhanced image ILR and the top-bottom enhanced image ITB to acquire second macro-blocks $MB2_{1,1}$~$MB2_{c,d}$ of the left-right enhanced image ILR and third macro-blocks $MB3_{1,1}$~$MB3_{e,f}$ of the top-bottom enhanced image ITB, separately.

Step 226: Calculate a correlation coefficient between a plurality of image features of a plurality of second left macro-blocks and a plurality of image features of a plurality of second right macro-blocks as a global similarity GS_SBS2, wherein a second left macro-block is the macro-block of the second macro-blocks $MB2_{1,1}$~$MB2_{c,d}$ located at the left-half of the left-right enhanced image ILR and a second right macro-block is the macro-block of second macro-blocks $MB2_{1,1}$~$MB2_{c,d}$ located at the right-half of the left-right enhanced image ILR.

Step 228: Calculate a correlation coefficient between a plurality of image features of a plurality of third top macro-blocks and a plurality of image features of a plurality of third bottom macro-blocks as a global similarity GS_TB2, wherein a third top macro-block is the macro-block of the third macro-blocks $MB3_{1,1}$~$MB3_{e,f}$ located at the upper-half of the top-bottom enhanced image ITB and a third bottom macro-block is the macro-block of the third macro-blocks $MB3_{1,1}$~$MB3_{e,f}$ located at the lower-half of the top-bottom enhanced image ITB.

Step 230: Calculate portion differences of second macro-blocks $MB2_{1,1}$~$MB2_{c,d}$ and third macro-blocks $MB3_{1,1}$~$MB3_{e,f}$ according to the image feature of second macro-blocks $MB2_{1,1}$~$MB2_{c,d}$ and third macro-blocks $MB3_{1,1}$~$MB3_{e,f}$.

Step 232: Compare the portion difference of each second left macro-block and the portion difference of the corresponding second right macro-block for acquiring a local similarity LS_SBS2.

Step 234: Comparing the portion difference of each third top macro-block and the portion difference of the corresponding third bottom macro-block for acquiring a local similarity LS_TB2.

Step 236: Determine whether the global similarity GS_SBS2 is greater than the threshold TH1 and the local similarity LS_SBS2 is smaller than the threshold TH2. If the global similarity GS_SBS2 is greater than the threshold TH1 and the local similarity LS_SBS2 is smaller than the threshold TH2, perform step 238; otherwise, perform step 242.

Step 238: Determine whether the global similarity GS_TB2 is greater than the threshold TH1 and the local similarity LS_TB2 is smaller than the threshold TH2. If the global similarity GS_TB2 is greater than the threshold TH1 and the local similarity LS_TB2 is smaller than the threshold TH2, perform step 240; otherwise, perform step 242.

Step 240: Determine whether the global similarity GS_SBS1 is greater than the global similarity GS_TB1. If the global similarity GS_SBS1 is greater than the global similarity GS_TB1, perform step 244; otherwise, perform step 246.

Step 242: Determine the image format of the single frame image to be the 2D image format.

Step 244: Determine the image format of the single frame image to be the side-by-side image format.

Step 246: Determine the image format of the single frame image to be the top-bottom image format.

Step 248: End.

In the detecting method 20, the image features utilized as determining standards can be luminance, edge, blob or entropy, and are not limited herein. According to the detecting method 20, the image format detecting device 10 shown in FIG. 1 can automatically detect whether a single frame image is a 3D image. Moreover, when the single frame image is the 3D image, the image format detecting device 10 further determines the image format of the single frame image to be the side-by-side format or the top-bottom format.

Figure 3A:
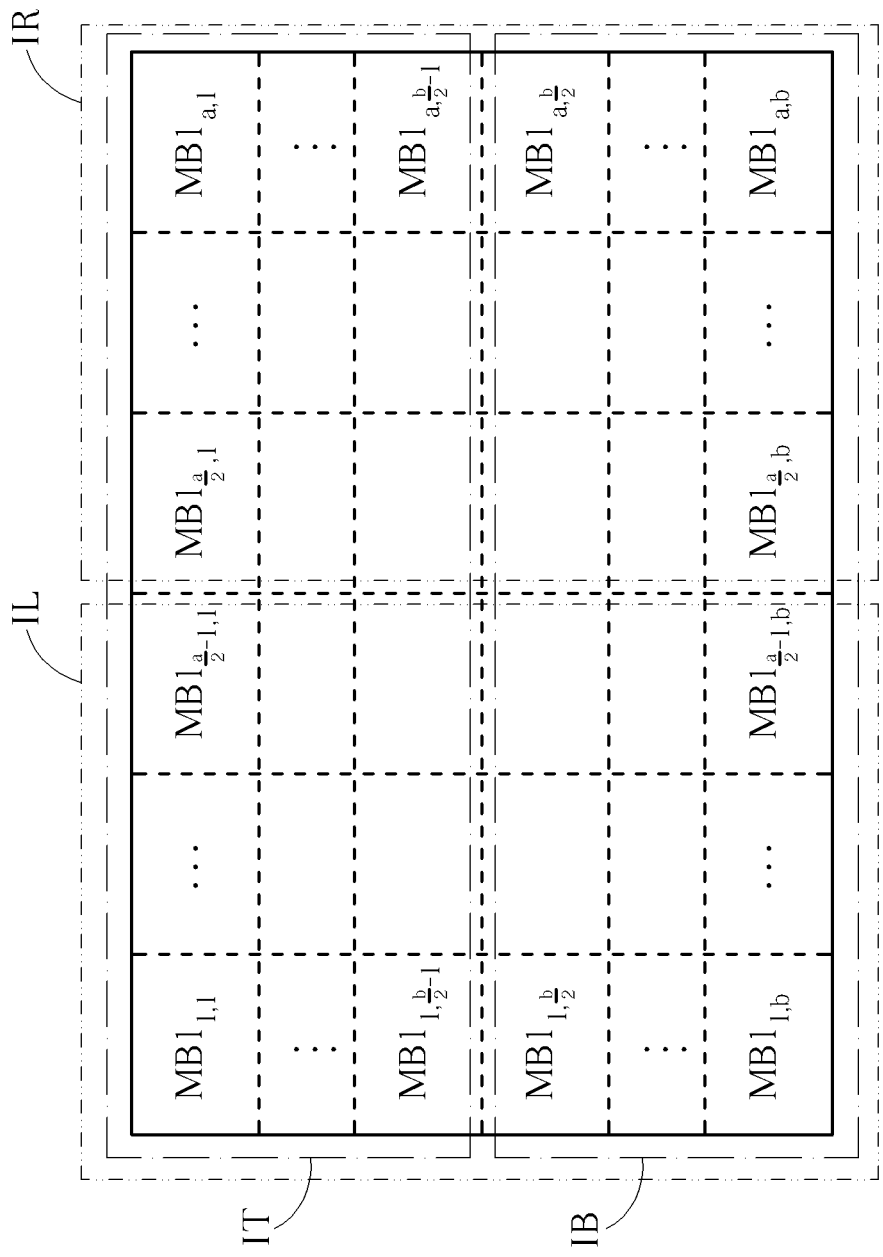
FIG. 3A is a schematic diagram of a single frame image according to the detecting method shown in FIG. 2A and FIG. 2B.

For details of the detecting method 20, please refer to FIG. 3A which is a schematic diagram of a single frame image 30 according to an embodiment of the present invention. The image format detecting device 10 firstly divides the single frame image 30 into the first macro-blocks $MB1_{1,1} \sim MB1_{a,b}$ (step 202). As shown in FIG. 3A, the left-half image IL in the single frame image 30 includes first macro-blocks $$MB1_{i,j}\left(i \in \left[1, \frac{a}{2}-1\right], j \in [1, b]\right).$$

The right-half image IR in the single frame image 30 includes first macro-blocks $$MB1_{i,j}\left(i \in \left[\frac{a}{2}, a\right], j \in [1, b]\right).$$

The upper-half image IT in the single frame image 30 includes first macro-blocks $$MB1_{i,j}\left(i \in [1, a], j \in \left[1, \frac{b}{2}-1\right]\right).$$

The lower-half image IB in the single frame image 30 includes first macro-blocks $$MB1_{i,j}\left(i \in [1, a], j \in \left[\frac{b}{2}, b\right]\right).$$

Then, the image detecting device 10 calculates the correlation coefficient between the image features of the left-half image IL and those of the right-half image IR according to the formula of the correlation coefficient in the statistics, for acquiring the global similarity GS_SBS1. The global similarity GS_SBS1 represents the overall similarity between the left-half image IL and the right-half image IR. The formula of the global similarity GS_SBS1 can be expressed as:

$$GS\_SBS1 = \frac{E[(IL - E(IL))(IR - E(IR))]}{\sqrt{Var(IL)} \sqrt{Var(IR)}} \quad (1)$$

Wherein, E(IL) represents the mean of the image features of the first macro-blocks in the left-half image IL and VAR(IL) represents the variance of the image features of the first macro-blocks in the left-half image IL, and so on. The detail of calculating the correlation coefficient should be well known to those of ordinary skill in the art, and is not narrated herein for brevity. Similarly, the image format detecting device 10 calculates the correlation coefficient between the image features of the upper-half image IT and those of the lower-half image IB, for acquiring the global similarity GS_TB1. The formula of the global similarity GS_TB1 can be expressed as:

$$GS\_TB1 = \frac{E[(IT - E(IT))(IB - E(IB))]}{\sqrt{Var(IT)} \sqrt{Var(IB)}} \quad (2)$$

Figure 3B:
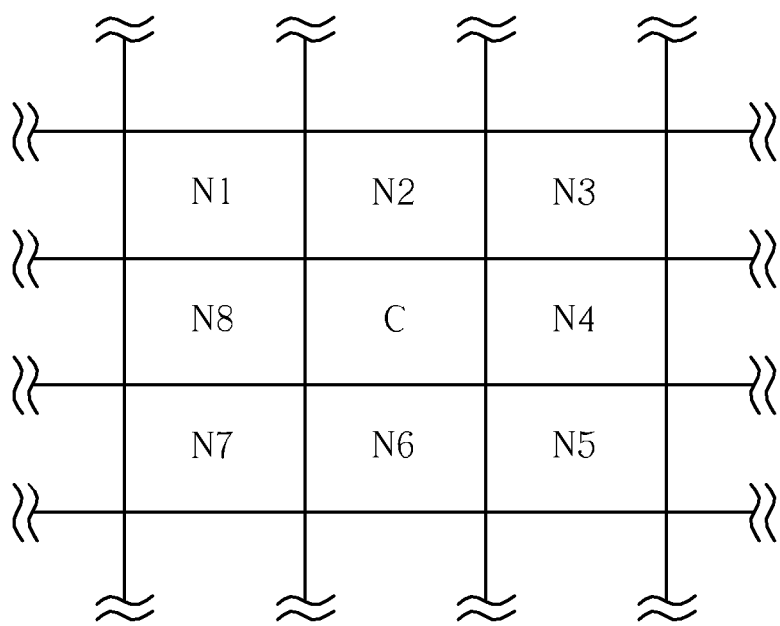
FIG. 3B is a schematic of a plurality of macro-blocks according to an embodiment of the present invention.

The image format detecting device 10 uses Census transform to calculate the portion differences of the first macro-blocks $MB1_{1,1} \sim MB1_{a,b}$ in this embodiment, but is not limited herein. Please refer to FIG. 3B, which is a schematic diagram of macro-blocks C, N1-N8 according to an embodiment of the present invention. When the image format detecting device 10 is required to calculate a portion difference of the macro-block C, the image format detecting device 10 acquires an 8 bits code as the portion difference of the macro-block C via comparing the image feature of the macro-block C and those of the adjacent macro-blocks N1-N8. For example, the first bit of the portion difference of the macro-block C is set to "1" when the image feature of the macro-block C is greater than or equal to that of the macro-block N1 (C≥N1). Otherwise, the first bit of the portion difference of the macro-block C is set to "0" when the image feature of the macro-block C is smaller than or equal to that of the macro-block N1 (C<N1). Similarly, the second bit of the portion difference of the macro-block C is set to "1" when the image feature of the macro-block C is greater than or equal to that of the macro-block N2 (C≤N2). Otherwise, the second bit of the portion difference of the macro-block C is set to "0" when the image feature of the macro-block C is smaller than or equal to that of the macro-block N2 (C<N2), and so on. As a result, the image format detecting device 10 acquires the portion difference of the macro-block C via comparing the image features between the macro-block C and macro-blocks N1-N8.

Please refer to FIG. 2A and FIG. 3A. After the image format detecting device 10 calculates portion differences of the first macro-blocks $MB1_{1,1}$-$MB1_{a,b}$ the image format detecting device 10 starts to compare the portion differences between corresponding macro-blocks of the left-half image IL and the right-half image IR, for acquiring the local similarity LS_SBS1. The local similarity LS_SBS1 represents the similarity between the corresponding macro-blocks of the left-half image IL and the right-half image IR, wherein corresponding macro-blocks in the left-half image IL and the right-half image IR mean the macro-blocks located at corresponding positions in the left-half image IL and the right-half image IR. For example, the first macro-block $MB1_{1,1}$ of the left-half image IL corresponds to the first macro-block $MB1_{2,1}$ of the right-half image IR. The first macro-block $MB1_{2,1}$ of the left-half image IL corresponds to the first macro-block $$MB1_{\frac{a}{2}+1,1}$$

of the right-half image IR, and so on. In this embodiment, via sequentially comparing the portion differences of the corresponding blocks of the left-half image IL and the right-half image IR, the image format detecting device 10 may add 1 in the local similarity LS_SBS1 from a pre-determined value (i.e. LS_SBS1=LS_SBS+1) when the portion differences of the corresponding blocks of the left-half image IL and the right-half image IR are different. As a result, the image format detecting device 10 can acquire the local similarity LS_SBS1 (Step 210). Similarly, the image format detecting device 10 can acquire the local similarity LS_TB1 through sequentially comparing the image features of the corresponding blocks of the upper-half image IT and the lower-half image IB (Step 212). Please note that the goal of step 204-212 is to acquire variables utilized for determining the image format of the single frame image 30 (i.e. the global similarity GS_SBS1, the global similarity GS_TB1, the local similarity LS_SBS1 and the local similarity LS_TB1). The sequence of acquiring the variables can be changed, or all variables can be acquired at the same time.

After acquiring the global similarity GS_SBS1, the global similarity GS_TB1, the local similarity LS_SBS1 and the local similarity LS_TB1, the image format detecting device 10 determines the image format of the single frame image 30 according to the global similarity GS_SBS1, the global similarity GS_TB1, the local similarity LS_SBS1, the local similarity LS_TB1, the threshold TH1 and the threshold TH2. When the global similarity GS_SBS1 is smaller than the threshold TH1, the overall similarity between the left-half image IL and the right-half image IR is low. Thus, the image format detecting device 10 determines the image format of the single frame image 30 to be not the side-by-side format and to be the 2D image format (step 214). Similarly, the overall similarity between the upper-half image IT and the lower-half image IB is low when the global similarity GS_TB1 is smaller than the threshold TH1. Thus, the image format detecting device 10 determines the image format of the single frame image 30 to be not the top-bottom format and to be the 2D image format (step 216). Next, the image format detecting device 10 detects the similarity between corresponding areas of the left-half image IL and the right-half image IR via determining whether the local similarity LS_SBS1 is greater than the threshold TH2. If the local similarity LS_SBS1 is greater than the threshold TH2, the difference level between corresponding macro-blocks of the left-half image IL and the right-half image IR is large. In such a condition, the image format detecting device 10 determines the image format of the single frame image 30 to be not the side-by-side format and to be the 2D image format (step 218). Similarly, if the local similarity LS_TB1 is greater than the threshold TH2, the difference level between corresponding macro-blocks of the upper-half image IT and the lower-half image IB is large. In such a condition, the image format detecting device 10 determines the image format of the single frame image 30 to be not the top-bottom format and to be the 2D image format (step 220).

In the steps 214-220, the image format detecting device 10 determines the image format of the single frame image, wherein the difference between the upper-half image and the lower-half image is large and the difference between the left-half image and the right-half image is large, to be the 2D image format according to the global similarity GS_SBS1, the global similarity GS_TB1, the local similarity LS_SBS1 and the local similarity LS_TB1. If, however, the image features of most part of a 2D image are similar (ex. a 2D image which is close to all black), the image format detecting device 10 may erroneously determine this image to be a 3D image. Please refer to FIG. 2B; the image format detecting device 10 further subtracts the image features between the corresponding macro-blocks of the upper-half image IT and the lower-half image IB (i.e. subtracts the image features of the upper-half image IT and those of the lower-half image IB) for acquiring the left-right enhanced image ILR, to detect the image format of the single frame image 30 more precisely. In comparison with the original single frame image 30, the differences between the left-half part and the right-half part of the left-right enhanced image ILR is enlarged via subtracting the image features of the upper-half image IT and those of the lower-half image IB. Similarly, the image format detecting device 10 further subtracts the image features between the corresponding macro-blocks of the left-half image IL and the right-half image IR (i.e. subtracts the image features of the left-half image IL and those of the right-half image IR) for acquiring the top-bottom enhanced image ITB. In comparison with the original single frame image 30, the difference between the upper-half part and the lower-half part of the top-bottom enhanced image ITB is enlarged via subtracting the image features of the left-half image IL and those of the right-half image IR (step 222). Then, the image format detecting device 10 performs operation methods similar to the steps 202-212, for acquiring the global similarity GS_SBS2, the global similarity GS_TB2, the local similarity LS_SBS2 and the local similarity LS_TB2; these steps are not narrated herein for brevity. Please note that, since the difference between the left-half part and the right-half part of the left-right enhanced image ILR is enlarged, the global similarity GS_SBS2 and the local similarity LS_SBS2 are acquired according to the left-right enhanced image ILR. Similarly, since the difference between the upper-half part and the lower-half part of the top-bottom enhanced image ITB is enlarged, the global similarity GS_TB2 and the local similarity LS_TB2 are acquired according to the left-right enhanced image ITB.

The image format detecting device 10 can detect the image format of the single frame image 30 more precisely according to the global similarity GS_SBS2, the global similarity GS_TB2, the local similarity LS_SBS2, the local similarity LS_TB2, the threshold TH1 and the threshold TH2. When the global similarity GS_SBS2 is smaller than the threshold TH1 and the local similarity LS_SBS2 is greater than the threshold TH2, the similarity between the left-half part and the right-half part of the single frame image 30 will still be below a standard after enlarging the differences between the left-half part and the right-half part of the left-right enhanced image ILR. In such a condition, the image format detecting device 10 determines the image format of the single frame image 30 to be the 2D image format (step 236). Similarly, when the global similarity GS_TB2 is smaller than the threshold TH1 and the local similarity LS_TB2 is greater than the threshold TH2, the similarity between the upper-half part and the lower-half part of the single frame image 30 will still be below the standard after enlarging the differences between the upper-half part and the lower-half part of the top-bottom enhanced image ITB (step 238).

When the steps 214-220, 236, 238 are established, the similarity between the left-half part and the right-half part of the single frame image 30 or the similarity between the upper-half part and the lower-half part of the single frame image 30 is greater than the standard. Thus, the image format detecting device 10 determines the image format of the single frame image 30 to be the 3D image format. Finally, the image format detecting device 10 determines the image format of the single frame image 30 to be the side-by-side format or the top-bottom format via comparing the global similarity GS_SBS1 and the local similarity GS_TB1. When the global similarity GS_SBS1 is greater than the global similarity GS_TB1, the image format detecting device 10 determines the image format of the single frame image 30 to be the side-by-side format. Otherwise, the image format detecting device 10 determines the image format of the single frame image 30 to be the top-bottom format when the global similarity GS_SBS1 is smaller than the global similarity GS_TB1 (step 240).

The main spirit of the present invention is filtering most of 2D images via comparing the similarity between the left-half part and the right-half part of the single frame image or the similarity between the upper-half part and the lower-half part of the single frame image. The image format of the single frame image can be correctly determined via comparing the similarity between the left-half part and the right-half part of the left-right enhanced image and the similarity between the upper-half part and the lower-half part of the top-bottom enhanced image. Those skilled in the art may accordingly observe appropriate alternations and modifications. For example, the image format detecting device 10 can execute the detecting method 20 according to different image features, such as luminance, edge and entropy, so as to acquire a more precise determining result.

Please note that the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits such as microcircuits, microchips, or silicon chips. Examples of the electronic system can include system on chip (SOC), system in package (Sip), computer on module (COM), and the image format detecting device 10.

The detecting method and related image format detecting device disclosed in the above embodiments can automatically determine the image format of a single frame image according to the image content of the single frame image. Thus, a user can have a more convenient user experience via adopting the detecting method and related image format detecting device disclosed in the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of automatically detecting image formats, comprising:
    dividing a single frame image into a plurality of first macro-blocks;
    calculating a correlation coefficient between a plurality of image features of a plurality of first left macro-blocks and a plurality of image features of a plurality of first right macro-blocks as a first global similarity, wherein a first left macro-block is the macro-block of the plurality of first macro-blocks belonging to a left-half image of the single frame image and a first right macro-block is the macro-block of the plurality of first macro-blocks belonging to a right-half image of the single frame image;
    calculating a correlation coefficient between a plurality of image features of a plurality of first top macro-blocks and a plurality of image features of a plurality of first bottom macro-blocks as a second global similarity, wherein a first top macro-block is the macro-block of the plurality of first macro-blocks belonging to an upper-half image of the single frame image and a first bottom macro-block is the macro-block of the plurality of first macro-block belonging to a lower-half image of the single frame image;
    calculating a portion difference of each first macro-block according to the image feature of each first macro-block;
    comparing the portion difference of each first left macro-block and the portion difference of the corresponding first right macro-block for acquiring a first local similarity;
    comparing the portion difference of each first top macro-block and the portion difference of the corresponding first bottom macro-block for acquiring a second local similarity; and
    detecting an image format of the single frame image according to the first global similarity, the second global similarity, the first local similarity, the second local similarity, a first threshold and a second threshold.

2. The method of claim 1, wherein the plurality of image features of the plurality of first left macro-blocks, the plurality of image features of the plurality of first right macro-blocks, the plurality of image features of the plurality of first top macro-blocks, the plurality of image features of the plurality of first bottom macro-blocks and the image feature of each first macro-block are luminance.

3. The method of claim 1, wherein the plurality of image features of the plurality of first left macro-blocks, the plurality of image features of the plurality of first right macro-blocks, the plurality of image features of the plurality of first top macro-blocks, the plurality of image features of the plurality of first bottom macro-blocks and the image feature of each first macro-block are edge characteristics.

4. The method of claim 1, wherein the step of calculating the portion difference of each first macro-block according to the image feature of each first macro-block comprises:
    comparing the image feature of each first macro-block and the image features of surrounding macro-blocks around each first macro-block.

5. The method of claim 1, wherein the step of detecting the image format of the single frame image according to the first global similarity, the second global similarity, the first local similarity, the second local similarity, the first threshold and the second threshold comprises:
    determining the image format of the single frame image to be a two-dimensional image format when the first global similarity is smaller than the first threshold.

6. The method of claim 1, wherein the step of detecting the image format of the single frame image according to the first global similarity, the second global similarity, the first local similarity, the second local similarity, the first threshold and the second threshold comprises:
   determining the image format of the single frame image to be a two-dimensional image format when the second global similarity is smaller than the first threshold.

7. The method of claim 1, wherein the step of detecting the image format of the single frame image according to the first global similarity, the second global similarity, the first local similarity, the second local similarity, the first threshold and the second threshold comprises:
   determining the image format of the single frame image to be a two-dimensional image format when the first local similarity is greater than the second threshold.

8. The method of claim 1, wherein the step of detecting the image format of the single frame image according to the first global similarity, the second global similarity, the first local similarity, the second local similarity, the first threshold and the second threshold comprises:
   determining the image format of the single frame image to be a two-dimensional image format when the second local similarity is greater than the second threshold.

9. The method of claim 1, further comprising:
   subtracting the image features of the upper-half image and the image features of the lower-half image for acquiring a left-right enhanced image and subtracting the image features of the left-half image and the image features of the right-half image for acquiring a top-bottom enhanced image when the first global similarity and the second global similarity are greater than the first threshold and the first local similarity and the second local similarity is smaller than the second threshold;
   dividing the left-right enhanced image and the top-bottom enhanced image to acquire a plurality of second macro-blocks of the left-right enhanced image and a plurality of third macro-blocks of the top-bottom enhanced image, separately;
   calculating a correlation coefficient between a plurality of image features of a plurality of second left macro-blocks and a plurality of image features of a plurality of second right macro-blocks as a third global similarity, wherein a second left macro-block is the macro-block of the plurality of second macro-blocks located at the left-half of the left-right enhanced image and a second right macro-block is the macro-block of the plurality of second macro-blocks located at the right-half of the left-right enhanced image;
   calculating a correlation coefficient between a plurality of image features of a plurality of third top macro-blocks and a plurality of image features of a plurality of third bottom macro-blocks as a fourth global similarity, wherein a third top macro-block is the macro-block of the plurality of third macro-blocks located at the upper-half of the top-bottom enhanced image and a third bottom macro-block is the macro-block of the plurality of third macro-blocks located at the lower-half of the top-bottom enhanced image;
   calculating portion differences of each second macro-block and each third macro-block according to the image feature of each second macro-block and each third macro-block;
   comparing the portion difference of each second left macro-block and the portion difference of the corresponding second right macro-block for acquiring a third local similarity;
   comparing the portion difference of each third top macro-block and the portion difference of the corresponding third bottom macro-block for acquiring a fourth local similarity; and
   detecting the image format of the single frame image according to the third global similarity, the fourth global similarity, the third local similarity, the fourth local similarity, the first threshold and the second threshold.

10. The method of claim 9, wherein the step of detecting the image format of the single frame image according to the third global similarity, the fourth global similarity, the third local similarity, the fourth local similarity, the first threshold and the second threshold comprises:
   determining the image format of the single frame image to be a two-dimensional image format when the third global similarity is smaller than the first threshold and the third local similarity is greater than the second threshold.

11. The method of claim 9, wherein the step of detecting the image format of the single frame image according to the third global similarity, the fourth global similarity, the third local similarity, the fourth local similarity, the first threshold and the second threshold comprises:
   determining the image format of the single frame image to be a two-dimensional image format when the fourth global similarity is smaller than the first threshold and the fourth local similarity is greater than the second threshold.

12. The method of claim 9, further comprising:
   determining the image format of the single frame image according to the first global similarity and the second global similarity when the third global similarity is greater than the first threshold, the third local similarity is smaller than the second threshold, the fourth global similarity is greater than the first threshold and the fourth local similarity is smaller than the second threshold.

13. The method of claim 12, wherein the step of determining the image format of the single frame image according to the first global similarity and the second global similarity comprises:
   determining the image format of the single frame image as a side-by-side format when the first global similarity is greater than the second global similarity.

14. The method of claim 12, wherein the step of determining the image format of the single frame image according to the first global similarity and the second global similarity comprises:
   determining the image format of the single frame image as a top-bottom format when the first global similarity is smaller than the second global similarity.

15. An image format detecting device, comprising:
   a processing unit; and
   a storage unit, for storing a program code for instructing the processing unit to perform the following steps:
      dividing a single frame image into a plurality of first macro-blocks;
      calculating a correlation coefficient between a plurality of image features of a plurality of first left macro-blocks and a plurality of image features of a plurality of first right macro-blocks as a first global similarity, wherein a first left macro-block is the macro-block of the plurality of first macro-blocks belonging to a left-half image of the single frame image and a first right macro-block is the macro-block of the plurality of first macro-blocks belonging to a right-half image of the single frame image;
      calculating a correlation coefficient between a plurality of image features of a plurality of first top macro-blocks and a plurality of image features of a plurality of first bottom macro-blocks as a second global similarity, wherein a first top macro-block is the macro-block of the plurality of first macro-blocks belonging to an upper-half image of the single frame image and a first bottom macro-block is the macro-block of the plurality of first macro-block belonging to a lower-half image of the single frame image;

calculating a portion difference of each first macro-block according to the image feature of each first macro-block;

comparing the portion difference of each first left macro-block and the portion difference of the corresponding first right macro-block for acquiring a first local similarity;

comparing the portion difference of each first top macro-block and the portion difference of the corresponding first bottom macro-block for acquiring a second local similarity; and detecting a format of the single frame image according to the first global similarity, the second global similarity, the first local similarity, the second local similarity, a first threshold and a second threshold.

16. The image format detecting device of claim 15, wherein the plurality of image features of the plurality of first left macro-blocks, the plurality of image features of the plurality of first right macro-blocks, the plurality of image features of the plurality of first top macro-blocks, the plurality of image features of the plurality of first bottom macro-blocks and the image feature of each first macro-block are luminance.

17. The image format detecting device of claim 15, wherein the plurality of image features of the plurality of first left macro-blocks, the plurality of image features of the plurality of first right macro-blocks, the plurality of image features of the plurality of first top macro-blocks, the plurality of image features of the plurality of first bottom macro-blocks and the image feature of each first macro-block are edge characteristics.

18. The image format detecting device of claim 15, wherein the processing unit compares the image feature of each first macro-block and the image features of surrounding macro-blocks around each first macro-block to acquire the portion difference of each first macro-block.

19. The image format detecting device of claim 15, wherein the processing unit determines the image format of the single frame image to be a two-dimensional image format when the first global similarity is smaller than the first threshold.

20. The image format detecting device of claim 15, wherein the processing unit determines the image format of the single frame image to be a two-dimensional image format when the second global similarity is smaller than the first threshold.

21. The image format detecting device of claim 15, wherein the processing unit determines the image format of the single frame image is a two-dimensional image format when the first local similarity is greater than the second threshold.

22. The image format detecting device of claim 15, wherein the processing unit determines the image format of the single frame image is a two-dimensional image format when the second local similarity is greater than the second threshold.

23. The image format detecting device of claim 15, wherein when the first global similarity and the second global similarity are greater than the first threshold and the first local similarity and the second local similarity is smaller than the second threshold, the program code further instructs the processing unit to perform the following steps:

subtracting the image features of the upper-half image and the image features of the lower-half image for acquiring a left-right enhanced image and subtracting the image features of the left-half image and the image features of the right-half image for acquiring a top-bottom enhanced image;

dividing the left-right enhanced image and the top-bottom enhanced image to acquire a plurality of second macro-blocks of the left-right enhanced image and a plurality of third macro-blocks of the top-bottom enhanced image, separately;

calculating a correlation coefficient between a plurality of image features of a plurality of second left macro-blocks and a plurality of image features of a plurality of second right macro-blocks as a third global similarity, wherein a second left macro-block is the macro-block of the plurality of second macro-blocks located at the left-half of the left-right enhanced image and a second right macro-block is the macro-block of the plurality of second macro-blocks located at the right-half of the left-right enhanced image;

calculating a correlation coefficient between a plurality of image features of a plurality of third top macro-blocks and a plurality of image features of a plurality of third bottom macro-blocks as a fourth global similarity, wherein a third top macro-block is the macro-block of the plurality of third macro-blocks located at the upper-half of the top-bottom enhanced image and a third bottom macro-block is the macro-block of the plurality of third macro-blocks located at the lower-half of the top-bottom enhanced image;

calculating portion differences of each second macro-block and each third macro-block according to the image feature of each second macro-block and each third macro-block;

comparing the portion difference of each second left macro-block and the portion difference of the corresponding second right macro-block for acquiring a third local similarity;

comparing the portion difference of each third top macro-block and the portion difference of the corresponding third bottom macro-block for acquiring a fourth local similarity; and detecting the image format of the single frame image according to the third global similarity, the fourth global similarity, the third local similarity, the fourth local similarity, the first threshold and the second threshold.

24. The image format detecting device of claim 23, wherein the processing unit determines the image format of the single frame image to be a two-dimensional image format when the third global similarity is smaller than the first threshold and the third local similarity is greater than the second threshold.

25. The image format detecting device of claim 23, wherein the processing unit determines the image format of the single frame image to be a two-dimensional image format when the fourth global similarity is smaller than the first threshold and the fourth local similarity is greater than the second threshold.

26. The image format detecting device of claim 15, wherein when the third global similarity is greater than the first threshold, the third local similarity is smaller than the second threshold, the fourth global similarity is greater than the first threshold and the fourth local similarity is smaller than the second threshold, the program code further instructs the processing unit to perform the following steps:

determining the image format of the single frame image to be a two-dimensional image format when the third global similarity is smaller than the first threshold and the third local similarity is greater than the second threshold.

27. The image format detecting device of claim 23, wherein the processing unit determines the image format of the single frame image as a side-by-side format when the first global similarity is greater than the second global similarity.

28. The image format detecting device of claim 23, wherein the processing unit determines the image format of the single frame image as a top-bottom format when the first global similarity is smaller than the second global similarity.

* * * * *